US012131351B2

(12) United States Patent
White et al.

(10) Patent No.: US 12,131,351 B2
(45) Date of Patent: Oct. 29, 2024

(54) SYSTEM AND METHOD FOR ENRICHING DIGITAL ADVERTISEMENT BID REQUESTS IN REAL-TIME BIDDING

(71) Applicant: P39 Tech LLC, New York, NY (US)

(72) Inventors: Alex White, New Rochelle, NY (US); Jonathan Schler, Petach Tikwa (IL); Pninit Dvir-Sheps, Netanya (IL); Irit Goren, Netanya (IL); Moriya Weinberg, Ramat Hasharon (IL); Arnon Brouner, Ramat Hasharon (IL)

(73) Assignee: P39 Tech LLC, New York, NY (US)

( * ) Notice: Subject to any disclaimer, the term of this patent is extended or adjusted under 35 U.S.C. 154(b) by 0 days.

(21) Appl. No.: 17/465,350

(22) Filed: Sep. 2, 2021

(65) Prior Publication Data

US 2023/0069621 A1 Mar. 2, 2023

(51) Int. Cl.
*G06Q 30/0273* (2023.01)
*G06F 16/28* (2019.01)

(52) U.S. Cl.
CPC ....... *G06Q 30/0275* (2013.01); *G06F 16/285* (2019.01)

(58) Field of Classification Search
CPC .................................................. G06Q 30/0275
See application file for complete search history.

(56) References Cited

U.S. PATENT DOCUMENTS 8,001,004 B2 8/2011 Protheroe et al.
9,117,219 B2 8/2015 Solomon et al.
9,129,308 B2 9/2015 Sankaran et al.
9,330,093 B1 * 5/2016 Chang ................. G06F 16/9566
10,445,784 B2 10/2019 Marsh
11,373,212 B2 * 6/2022 Schwartz ........... G06Q 30/0267
11,403,364 B2 * 8/2022 Yang ....................... G06F 16/93
2005/0165758 A1 * 7/2005 Kasten ................ G06F 12/0875
2012/0158496 A1 6/2012 Solomon et al.
2014/0279056 A1 * 9/2014 Sullivan ............. G06Q 30/0275 705/14.71
2017/0091828 A1 * 3/2017 Siegler ............... G06Q 30/0269
2019/0037358 A1 * 1/2019 Jenkins ............... H04L 61/5007
2019/0095510 A1 * 3/2019 Cruise ................... G06F 11/323
2020/0242170 A1 * 7/2020 Pogrebezky .......... G06F 16/986
2020/0334258 A1 * 10/2020 Bortnikov ......... G06F 16/24552
2022/0351244 A1 * 11/2022 Korada .............. G06Q 30/0275

OTHER PUBLICATIONS

Evans, David S. et al. "The Economics of The Online Advertising Industry". Review of Network Economics. vol. 7, Issue 3—Sep. 2008.

* cited by examiner

*Primary Examiner* — Marie P Brady
(74) *Attorney, Agent, or Firm* — M&B IP Analysts, LLC

(57) ABSTRACT

A method and system for enriching bid requests for real-time bidding on a digital advertisement placement are provided. The method comprises processing a received bid request to extract at least one data point, wherein the bid request is received from a website requesting placement of a digital advertisement; causing generation of at least one enriched data point based on the at least one extracted data point; and associating the at least one enriched data point with the received bid request to allow a refined real-time bidding on a placement of a digital advertisement in a webpage of the website in response to the bid on the received bid request.

22 Claims, 3 Drawing Sheets

SYSTEM AND METHOD FOR ENRICHING DIGITAL ADVERTISEMENT BID REQUESTS IN REAL-TIME BIDDING

TECHNICAL FIELD

The present disclosure relates generally to web advertising and, in particular, to systems and methods for enriching bid requests for real-time bidding (RTB).

BACKGROUND

As computers, smartphones, and other internet-equipped devices become increasingly common in daily life, the users of such devices represent a growing segment of the market for advertisement. Digital advertising provides retailers, service providers, and other parties interested in advertising with the opportunity to reach audiences not previously available. Digital advertisements may be presented through various avenues including, for example and without limitation, internet advertisements (ads), mobile device ads, smart device ads, connected TV's, smart home devices, and the like. Digital advertising, in addition to offering advertisers greater reach than the same advertisers may enjoy through print, radio, or television ads, also offers advertisers greater flexibility in ad placement. Specifically, digital advertising provides for a greater degree of accuracy in ad targeting than may be achievable through conventional advertising means.

As digital advertising may be sold on a per-view or per-click basis, or the like, advertisements (ads) which are improperly targeted may result in little revenue or engagement, while also causing advertisers to accrue high expenses. As a result, advertisers may wish to reach specific market segments, such as young people, people with specific hobbies or interests, and the like, in order to better reach the target demographic. Certain solutions to the identification of valuable ad real-estate, such as the top ad on a website or mobile application (app) popular with a specific, desirable, demographic, includes real-time bidding (RTB) solutions. RTB solutions may include generating, for each user who visits a website (or app), a per-visit bid request. Such a bid request can include various pieces of data, such as the requested webpage, the user's device, and the location of the placement on the page.

In an RTB environment, an RTB controller or system may solicit advertisers to bid on an ad placement for a specific bid request, allowing the highest-bidding advertiser to place an ad which the user will see upon loading the webpage. A bid request may include a uniform resource locator (URL) of a webpage to place the ad, an in-page location, a time stamp, and the like.

While RTB solutions provide for the placement of ads according to the advertisers' preferences, the same solutions face certain limitations. First, RTB solutions are limited by the amount, type, and quality of data included in a bid request, causing advertisers to place bids with a limited view of the value of any given ad placement. As a result of the limited information available in RTB, advertisers may bid for ad placements which are ineffective in generating engagement or may fail to bid on placements which would generate the desirable engagement. In addition, RTB solutions are limited to short transactions, in order to provide the identification of a winning bid, and the placement of an ad associated with the winning bid, in a sufficiently short time, as to allow the webpage or other content to load without delay.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for enriching bid requests for real-time bidding on a digital advertisement placement are provided. The method comprises processing a received bid request to extract at least one data point, wherein the bid request is received from a website requesting placement of a digital advertisement; causing generation of at least one enriched data point based on the at least one extracted data point; and associating the at least one enriched data point with the received bid request to allow a refined real-time bidding on a placement of a digital advertisement in a webpage of the website in response to the bid on the received bid request.

In addition, certain embodiments disclosed herein include a system for enriching bid requests for real-time bidding on a digital advertisement placement. The system comprises a processing circuitry; and a memory, the memory containing instructions that, when executed by the processing circuitry, configure the system to: process a received bid request to extract at least one data point, wherein the bid request is received from a website requesting placement of a digital advertisement; cause generation of at least one enriched data point based on the at least one extracted data point; and associate the at least one enriched data point with the received bid request to allow a refined real-time bidding on a placement of a digital advertisement in a webpage of the website in response to the bid on the received bid request.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
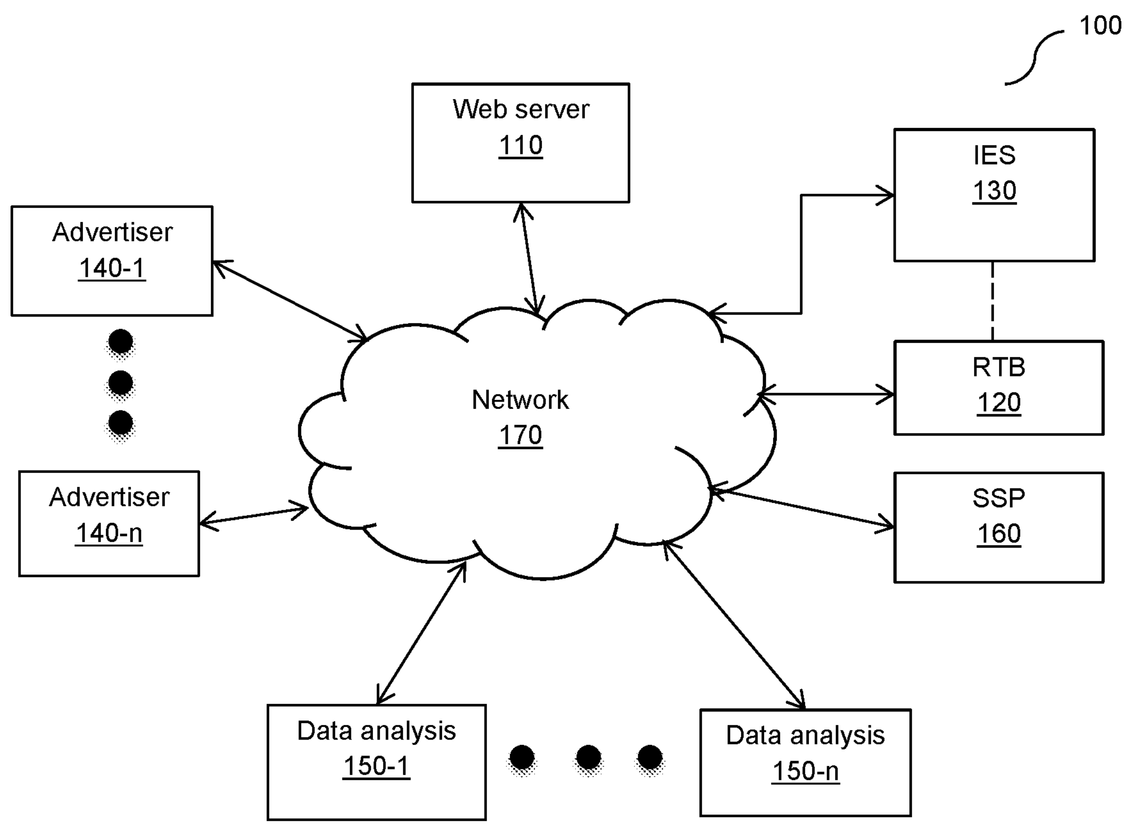
FIG. 1 is a network diagram depicting a network system configured providing enriched data points to advertisers, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of examples, a system and method for enriching bid requests for real-time bidding on a digital advertisement placement are provided. The method, in an example embodiment, is realized through processing a received bid request to extract at least one data point, wherein the bid request is received from a website requesting placement of a digital advertisement; generating enriched data points based on at least one extracted data point from the bid requests; and associating the enriched data points with the received bid request to allow real-time bidding on a placement of a digital advertisement in a webpage of the website. The enriched data points may allow advertisers to refine their bids on the received bid request.

The embodiments disclosed herein relate to enriching bid requests for bidding on a digital advertisement placement of advertisements through generating additional information (enriched data points) related to the bid requests. The enriched data points are generated in real-time to allow advertisers to refine their bids on the received bid requests, as such requests are received. The disclosed embodiments provide for reduced processing time for advertisers and, thus, improved computational efficiency in the bidding on requests for digital advertisement placement. The disclosed embodiments further allow the obtainment of additional information that can supplement or enrich the bid requests through one or more third-party (external) data analysis systems. The access to such systems is performed, in-real-time, through application programming interfaces (APIs) exposed by the data analysis systems including the disclosed system. Currently available real-time bidding systems do not include the means for accessing such analysis systems. To further emphasize, digital advertisements are placed within micro-seconds while the number of bid requests required to be serviced are millions per second. Thus, the enriching process described herein cannot be performed manually.

FIG. 1 is an example network diagram 100 depicting a network system configured for providing enriched data points to advertisers, according to an embodiment. The depicted network diagram 100 includes a web server 110, a real-time bidding (RTB) system 120, multiple advertisers, 140-1 through 140-N (hereinafter, “advertiser” 140 or “advertisers” 140), any multiple data analysis systems, 150-1 through 150-N(hereinafter, “data analysis system” (DAS) 150 or “data analysis systems” (DASs) 150). Further, as depicted, a bid request enrichment system (IES) 130 is connected to RTB 120. In an embodiment, the IES 130 includes a cache memory and an enrichment engine (shown in FIG. 3). The IES 130 may be a standalone system or be integrated in the RTB system 120. In an optional configuration, at least one supply-side platform (SSP) 160 is also communicatively connected to the RTB system 120.

It may be understood that the components and configuration described with respect to FIG. 1 are so provided for purposes of exemplary illustration and that other, like, components, and combinations or configurations thereof, may be likewise applicable to the embodiments disclosed herein without loss of generality or departure from the scope of the disclosure. Further, as is applicable to the advertisers 140 and the DASs 150, ‘N’ is an integer having a value greater than or equal to two.

The various components discussed with reference to FIG. 1 are connected through a network 170. Such networks may include, as examples and without limitation, wireless, cellular, or wired networks, local area networks (LANs), wide area networks (WANs), metro area networks (MANs), the Internet, the worldwide web (WWW), similar networks, and any combination thereof. The network 170 may be a full-physical network, including exclusively physical hardware, a fully-virtual network, including only simulated or otherwise virtualized components, or a hybrid physical-virtual network, including both physical and virtualized components. Further, the network may be configured to encrypt data, both at rest and in motion, and to transmit encrypted, unencrypted, or partially-encrypted data.

The network may be configured to connect to the various components of the system via wireless means such as Bluetooth (tm), long-term evolution (LTE), Wi-Fi, other, like, wireless means, and any combination thereof, via wired means such as, as examples and without limitation, Ethernet, universal serial bus (USB), other, like, wired means, and any combination thereof. Further, the network 170 may be configured to connect with the various components of the system via any combination of wired and wireless means.

The web server 110 is a web server, content delivery network (CDN), or the like, configured to provide website visitors with website content, including advertisements. In some embodiments, the content is delivered via the web server 110, while the actual advertisement is delivered using an ad server. Thus, hereinafter to the term web server 110 should be understood as composing both elements, the content server, and the ad server.

The web server 110 may be configured to respond to a user’s website access request by generating a bid request and serving webpages (or other content) to the user device (not shown). Webpages are typically processed and displayed over web browsers or mobile applications (apps). The served webpages may include one or more advertisements (ads). An advertisement may include, without limitation, a multimedia element, such as an image, text, video, audio, and the like, or any combination thereof.

The advertisements are typically served by a system, SSP 160, which may be different from the web server 110 after a low-latency transaction with the RTB system 120. Specifically, the web server 110 may be configured to transmit a request to the RTB system 120 and to receive, from the RTB system 120, or, variously, the SSP 160, an advertisement data feature configured for display by inclusion as a website content data feature. The transaction between the web server 110 and the RTB system 120, or SSP 160, may be sufficiently rapid to provide for real-time or near-real-time bidding on advertisement placement based on the transmitted bid request.

The bid request, initiated by the server 110 is a data feature including one or more descriptors or data points relevant to the webpage provided by the web server 110 in response to the user’s access request, as well as various attributes of the access request. The generated bid request may include, as examples and without limitation, the uniform resource locator (URL) of the requested webpage, a user internet protocol (IP) address (or location descriptor), a timestamp, or other configuration, and the like. As an example, a bid request generated for a visitor to a sports news website may include descriptors or data points providing the URL of the sports news website, or a specific requested page thereof, the user location from which the user generated the webpage access request, and the like.

The web server 110 may be implemented as a physical device, system, component, or the like, as a virtual device, system, component, or the like, or in a hybrid physical-virtual implementation. The web server 110 may be connected to the RTB system 120, the SSP 160, over the network 170.

The RTB system 120 is a system, device, component, or the like, configured to provide real-time bidding functionalities. According to the embodiments disclosed herein, the RTB system 120 may be configured to provide enriched data points for real-time bidding on bid requests. The generation of enriched data points are described hereinbelow and are different than those provided by prior art solutions for real-time bidding based on non-enriched data points. To this end, the IES 130 may be configured to receive one or more data points from bid requests generated by the web server 110, to enrich such bid request data points, as described hereinbelow, and to provide such enriched data points, through the RTB system 120, to the advertisers 140. The advertisers 140 may make decisions whether or not to make a bid, based on the enriched data points. Further, the RTB 120 may be configured to apply the results of an advertiser 140 bidding on the enriched data points to the selection of one or more advertisement placements, and to provide the selected advertisement placements to the web server 110 for placement in the website content transmitted therefrom to the user, or to provide such placements to the SSP 160 for similar purposes.

The IES 130 is a device, component, system, or the like, configured to, as described hereinbelow, to generate enriched data points using information provided by the DASs 150. The IES 130 may communicate with the various data analysis systems 150 directly through the network 170. The data analysis systems 150 are not part of the IES 130 and are not controlled by the IES 130. Further, the DASs 150 may be operated by third-party companies. Alternatively, or collectively, the IES 130 may add data points, based on information stored, learned, or acquired by the IES.

An example of an IES 130, according to an embodiment, is described with respect to FIG. 3, below. The IES 130, in some configuration, may be a component of the RTB system 120. It may be further understood that the IES 130 may be a cloud-based or other, like, device, component, system, or the like, and may be connected to the RTB system 120 via those connections described herein.

Accordingly, the RTB system 120 may be connected to the web server 110, the advertisers 140, and the SSP 160 over the network 170. Further, the IES 130 may be connected to the data analysis systems 150 over the network 170. It may be understood that any of the RTB system 120, and the IES 130 may be implemented as physical systems, as virtual systems, or in hybrid physical-virtual configurations. Further, the IES 130 may be implemented, realized, or integrated in a cloud computing platform. The RTB system 120 receives the bid requests and passes them to the IES 130 as a data point for enrichment.

The advertisers 140 are systems, devices, components, or the like, configured to provide advertising bids for a bid request through the RTB system 120. In an embodiment, the advertisers 140 can be on a bid request, enriched with data points, as will be discussed herein. The advertisers 140 may be configured to provide bids in varying amounts, in response to bid requests or enriched data points, including in amounts depending on the contents of the bid request or enriched data points. An example of the operation of the advertisers 140 within the depicted system is provided hereinbelow. It may be understood that the advertisers 140 may be physical devices, components, systems, or the like, virtual devices, components, systems, or the like, or any combination thereof. It should also be noted that an advertiser 140 does not receive bid requests, but rather is configured to make a decision on placing a bid based on the request. The processing of bid requests is performed by the RTB 120.

The SSP 160 is a system, component, device, or the like, configured to provide one or more advertisement data features to the web server 110 in response to a determination, by the RTB system 120, of a winning bid of an advertiser for a bid request. It may be understood that the SSP 160 may be a physical system, a component, device, or the like, a virtual system, component, device, or the like, or any combination thereof.

There is a process in the IES 130 that is expanding those received data points that can be enhanced. Those extracted data points enhanced by the IES 130 can be further enriched by the DASs 150. For example, a data point from bid request is a URL. The IES 130 expands the data points of the URL to also include images and text. These are now two new data points that can be enriched by data in the IES 130 or the DAS 150.

The data analysis systems (DASs) 150 are systems, components, devices, or the like, configured to provide one or more enriched data points in response to data points extracted received from the IES 130 (either as extracted data points or original data points contained in the bid request). DASs 150 may include, as examples and without limitation, weather services configured to return weather enriched data points based on received location data points, image recognition services configured to return image enriched data points based on image data points, text analysis services, video analysis services, metadata analysis services, and the like, as well as any combination thereof, all as received from IES. As noted above, the DASs 150 communicate with the IES 130 over the network 170. That is, the IES 130 can query any DAS 150 over the network. Such queries or requests may be submitted through application programming interface (API) exposed by a DAS 150 or by IES 130.

It may be understood that the DASs 150 may be a physical system, component, device, or the like, a virtual system, component, device, or the like, or any combination thereof. An example of the operation of the DASs 150 within the depicted system is provided hereinbelow. Further, it may be understood that the DASs 150 may be various systems, or the like, provided by one or more hosts, vendors, or the like, where such DASs 150 may be configured to operate as described herein.

It may be understood that the various components of the network system described with respect to FIG. 1 may be separately-implemented, including in multiple, separate locations, and may be interconnected via one or more networks.

As an example of the operation of the system depicted with respect to FIG. 1, a user may attempt to access a sports news website by entering the website's URL into a browser or mobile application installed on the user's device. In response to receiving the request from the user, the web server 110 may be configured to send a bid request to the RTB system 120, the bid request including the URL of the sports news website and the location information of the user. In response to receiving the bid request from the web server 110, the RTB system 120 may be configured to enrich the bid request using the enriched data points provided by the IES

130. To this end, the IES 130 may be configured to check whether enriched data points for the sports news website's URL are already cached, and, if not, to generate a set of extracted (non-enriched) data points based on the received bid request.

According to the same example, the extracted data points may include various features related to the bid request data points, such as images or text from the webpage communicated by the URL designated in the bid request. Other examples may include but not be limited to, page classification, important text, important images, videos, webpage structures, and so on. The extracted data points may include the bid request's information. Further, according to the same example, the IES 130 may be configured to enrich the extracted data points using the DASs 150, and collection or receipt of the enriched data points set therefrom. The connection between the IES 130 and DASs 150 is over the network 170.

Upon receipt of the extracted data points or data points, the DASs 150 may be configured to generate enriched data points based on the received extracted data points or data points. Examples for enriched data points may include, location, weather forecasts based on the location, where the location is determined based on the general location data, and image analyses, such as a description that the webpage specified by the URL includes three pictures of a star player for a national baseball team, and the like. The DASs 150 may be configured to return the enriched data points to the IES 130, or to provide such enriched data points for collection by the IES 130.

According to the same example, following collection or receipt of enriched data points from the DASs 150, the IES 130 may be configured to provide the enriched data points to the RTB 120 for bidding, or otherwise to be used by the advertisers 140 to refine their bids or not bid at all. The IES 130 may be further configured to store the enriched data points in the cache (e.g., memory 320, FIG. 3) for future access, and to return the enriched data points to the RTB system 120 for provision to the advertisers 140. It should be noted that the enriched data points are not combined, added, or part of the bid request.

According to the same example, upon receipt of the enriched data points from the IES 130, the RTB system 120 may be configured to provide the enriched data points to the advertisers 140 for bidding or to not bid. The advertisers 140 may bid on a bid request based on the respective enriched data points according to one or more rules. Such rules may be variously-defined by the advertisers 140, with the bidding process resulting in identification of a single advertisement for the relevant bid request.

As an example, where the enriched data points may include specification of the URL of the sports news website, identification of the user's local weather condition as sunny, and identification of three images of a national star player within the webpage, the RTB process may result in the identification of an advertisement for tickets to see the star player's team that night as the winning bid, including a price for the winning bid.

As a second example, where the enriched data point may include the same information, but identifies the user's local weather condition as rainy, the RTB 120 process may result in the identification of an advertisement for tickets to see the star player's team on a later date as a winning bid, including a lower price for the winning bid. The differences between the given examples may reflect differences between the advertisers' 140 enriched data points bidding rules, such as, for example, where such rules may emphasize paying a higher price for ads for same day tickets, as opposed to future tickets. The rules may emphasize displaying ads for the relevant team when an enriched data point includes identification of images of a specific player, and where such rules forbid placing bids for same-day ticket ads when the enriched data point includes information specifying a rainy local weather condition.

Further, where a winning bid is identified, according to the same example, the RTB system 120 may be configured to provide the advertisement relevant to the winning bid to the web server 110 for placement in the webpage version returned to the user, or to provide the winning advertisement to the SSP 160, for provision to the web server 110 and subsequent placement of the advertisement. The web server 110 may be configured to place the winning advertisement within the webpage and to return the webpage version, including the winning advertisement, to the user in response to the user's request.

It may be understood that the execution of the process described with respect to the example above may occur with sufficiently low latency as to allow a user to browse between webpages, the webpages including advertisements selected and placed as described, with little to no interruption. Further, it may be understood that the example provided above is provided for illustrative purposes, without limitation as to the various embodiments disclosed herein.

Further, it may be understood that the system of FIG. 1, as well as the examples describing the operation thereof, are provided for purposes of example and that other, like, systems, and configurations thereof, may be likewise applicable to the principles disclosed herein without loss of generality or departure from the scope of the disclosure. Such similar systems, which may be likewise applicable to the descriptions provided herein, include systems configured to provide RTB functionality for the placement of one or more ads on or in various devices including, as examples and without limitation, smartphones, smart appliances (including smart TV or connected TV (CTV)), and the like, as well as combinations thereof. Where, as described, the disclosure provided herein applies to such systems, including systems not including a web server 110 accessible via web browser requests, the relevant system or systems may be understood to apply the functionalities disclosed herein to the placement of one or more advertisements via such systems.

As an example of an alternate configuration, applicable to the placement of ads within a mobile application installed on a smartphone, the web server 110 may be replaced with an application content delivery network (CDN), wherein the application CDN is configured to provide and execute those functionalities, with respect to an application installed on a smartphone, which may be similarly provided by the web server 110. The example alternate configuration provides for the collection of bid requests, based on a user's interaction with the smartphone application, and processing of such bid requests, for RTB 120, as described herein. That is, the disclosed embodiments are applicable to any type of user device and any type of application that can display ads.

It should be noted that process performed by the IES 130 to enrich bid requests may be performed without storing any cookies, or other data structure, in the user device.

Figure 2:
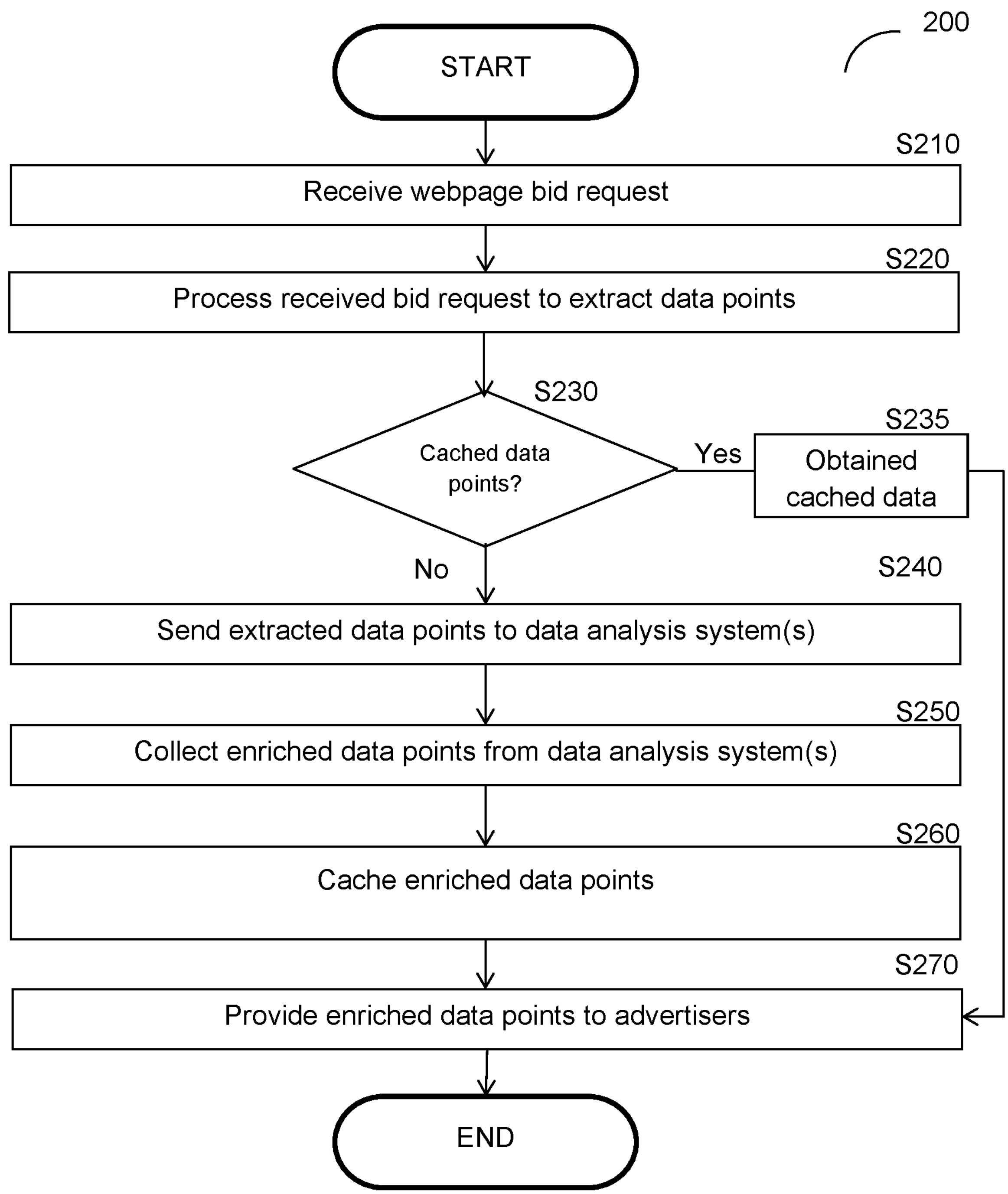
FIG. 2 is a flowchart depicting a method for enriching bid requests for real-time bidding (RTB), according to an embodiment.

FIG. 2 is an example flowchart 200 depicting a method for enriching bid requests for real-time bidding (RTB), according to an embodiment. The method described with respect to FIG. 2 may be executed by the IES system 130, of FIG. 1, above. The method of FIG. 2 is described herein with respect to webpages for purposes of exemplary simplicity, and other, like, implementations, including those relevant to placement of advertisements in mobile phone or smart device applications, or the like, may be similarly-applicable without loss of generality, or departure from the scope of the disclosure.

At S210, a webpage bid request is received. As described with respect to FIG. 1, above, a webpage bid request is a data feature including one or more descriptors relevant to the webpage provided by a web server 110 in response to the user's access request, as well as various attributes of the access request. The generated bid request may include, as examples and without limitation, the uniform resource locator (URL) of the requested webpage, user internet protocol (IP) address, or location data point (same as above), and the like. A webpage bid request may be received from one or more sources including, without limitation, the web server, 110, of FIG. 1, above.

At S220, the received bid request is processed to extract or otherwise generate extracted data points. Processing of the received bid request may include extraction of bid request data, extraction of webpage data, or both. As bid request data includes data relevant to the bid request generated upon a user's request to access a webpage, data which may be extracted from the bid request may include, as examples and without limitation, the URL of the webpage, the user's location data (e.g., zip code, information gathered from nearby by wireless networks or cellular networks, device location, and the like) the user's browser and browser version, date stamps, timestamps, and the like, as well as any combination thereof.

Further, where S220 includes the extraction of webpage data, data from one or more webpages may be extracted by identifying one or more relevant URLs included in the bid request data also extracted at S220. Extraction of webpage data may include accessing the webpage or webpages specified by the extracted URLs and applying one or more content extraction algorithms thereto, where such content extraction algorithms may be configured to identify and extract one or more webpage content elements. Webpage content elements which may be extracted as data points at S220, may include, as examples and without limitation, important text, important images, videos, webpage structures, and the like, as well as any combination thereof. Extracted webpage content elements may be extracted as data points configured for analysis by the one or more DASs, as described herein.

Content extraction algorithms, as may be applied to the processing of received bid requests at S220, may include various algorithms configured to extract and classify one or more webpage elements, where such algorithms may be further configured to provide high-quality extracted data with low-to-no "noise." Content extraction algorithms may include various machine learning (ML) algorithms. Content extraction algorithms may be configured to, as an example and without limitation, scan webpages automatically to identify and extract sections and paragraphs based on properties such as text and style, including font, size, color, and the like, as well as in-page location. Further, content extraction algorithms may be configured to generate one or more vector-based representations of a webpage, wherein each webpage element is represented as a vector component. In addition, within the representative vector, each webpage element, represented as a vector component, may include descriptions of webpage element properties or features, the descriptions providing insights regarding the element's role in the webpage, including, as examples and without limitation, font type, font size, font color, in-page location, number of words, number of lines, and the like.

In addition to identifying webpage elements and generating representative vectors thereof, content extraction algorithms, as may be applicable to the processing of received bid requests at S220, may be configured to identify one or more roles for each element. An example of an element role may be "title," "text," "comments," "non-relevant," and the like. Further, the content extraction algorithm may be configured to include one or more classifier functions or may be configured to prepare analyzed data for classification by such functions. Classifier functions may be configured to provide refined, relevant results in the classification of webpage elements. Such classifier functions may be ML models, or other, like, functions, configured to determine whether a content element matches one or more classifications, where such classifications may be relevant to subsequent data enrichment.

At S230, it is checked if there are any cached enriched data points that can be associated with the extracted data points. If so, at S235, such cached enriched data points are obtained from the cache, and execution continues with S240.

At S240, the extracted data points are sent to one or more data analysis systems (DASs). A DAS, as described with respect to FIG. 1, is configured to provide one or more enriched data points in response to extracted data points, bid request data features, or both. Further, sending to DASs may include selective sending based on one or more rules, where such rules may be predetermined according to one or more factors including, without limitation, a bid request source, such as a source website or URL, DAS identities and functions, and the like, as well as any combination thereof.

At S250, enriched data points are collected from the DASs. The enriched data points may include an additional layer of data providing additional description related to the extracted data points. For example, if an extracted data point is a location, then the enriched data point may be weather information at that location. As another example, if the extracted data point is an image, then the enriched data point may be a description of the image (e.g., cats). As yet another embodiment, if the extracted data point is a text, enriched data point may be a demographic of the population that may be interested in such a text (e.g., political left-wing voters).

At S260, the enriched data points are cached in association with the corresponding extracted data points. The enriched data points may be cached by storing the data points to the cache of the IES. Further, caching the enriched data points may include caching the enriched data points with a key, association, index, or other, like, data feature, where the data feature is configured to provide for in-cache location of various enriched data points according to the values of the stored data features, such as in a cache search process, such as that described with respect to S230. In an embodiment, the enriched data points may be cached with a URL matching the URL of the webpage included in the bid request. It should be noted that enriched data points may have a different cache refresh policy than the extracted data points.

At S270, the enriched data points are provided to advertisers during the RTB process. The enriched data points may be provided in association to the received bid request, and may be provided to advertisers as described with respect to FIG. 1, above. It should be noted that the enriched data points may be provided to any entity in the ad placement ecosystem. This includes the supply-side platforms, demand-side platforms, marketplaces, and the like.

Figure 3:
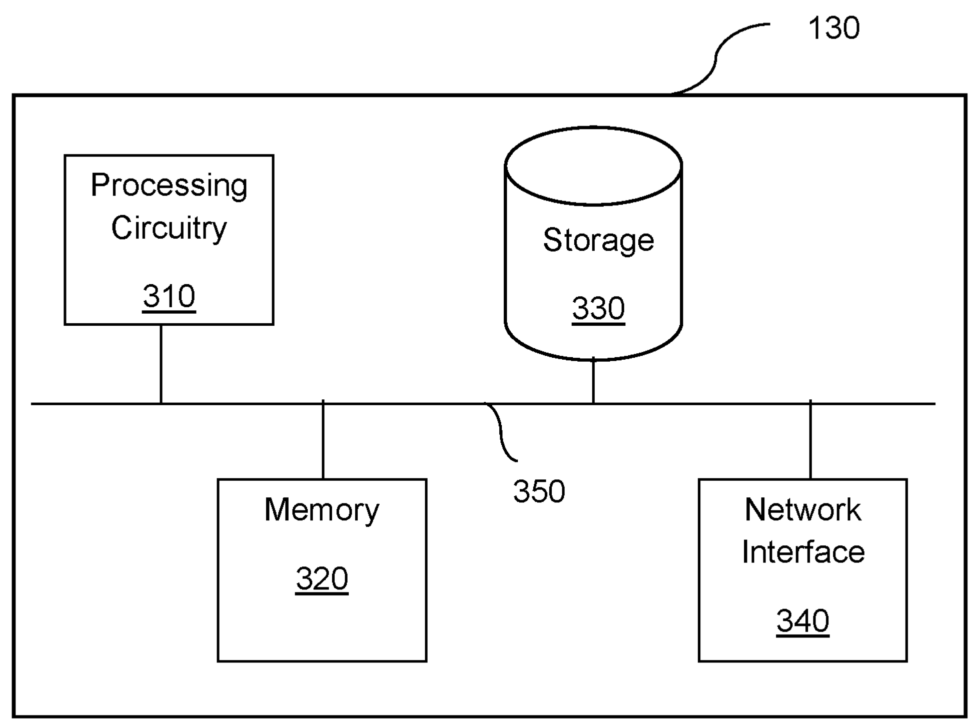
FIG. 3 is a schematic diagram of a request enrichment system (IES) according to an embodiment.

FIG. 3 is an example schematic diagram of a bid request enrichment system (IES) 130, according to an embodiment. The IES 130 includes a processing circuitry 310 coupled to a memory 320, a storage 330, and a network interface 340. In an embodiment, the components of the IES 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read only memory, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

In an embodiment, the memory 320 servers as a cache memory to cache data points (enriched or extracted). The storage 330 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 340 allows the IES 130 to communicate with the various components, devices, and systems described herein for enriching bid requests for real-time bidding, as well as other, like, purposes.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Further, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for enriching bid requests for real-time bidding on a digital advertisement placement, comprising:

processing a received bid request to extract at least one data point, wherein the bid request is received from a website requesting a placement of a digital advertisement, wherein extracting the at least one data point further comprises extracting webpage content elements included on a webpage specified in a uniform resource locator (URL) included in the received bid request;

determining that at least one enriched data point associated with the at least one extracted data point is missing from a cache memory, wherein the enriched data points include at least an additional layer of information on the at least one extracted data point;

causing generation, by at least one external data analysis system, of the at least one enriched data point based on the at least one extracted data point upon determining that at least one enriched data point associated with the at least one extracted data is missing from the cache memory, wherein the at least one external data analysis system exposes at least one application programming interface (API);

receiving, by the at least one external data analysis system, the at least one extracted data point that includes the webpage content elements;

associating the at least one enriched data point with the received bid request; and providing, via a real-time bidding system, the at least one enriched data point to a plurality of advertiser systems to allow a refined real-time bidding on the placement of the digital advertisement in a webpage of the website in response to a bid on the received bid request, wherein the real-time bidding system is configured to access the at least one enriched data point from the at least one external data analysis system via the API.

2. The method of claim 1, wherein the received bid request includes at least: an identifier, a uniform resource locator (URL) of a requested webpage, a request application identifier, a mobile application, a bundle identifier for a connected TV application, a user location data, a date, and a time.

3. The method of claim 1, wherein extracting at least one data point further comprises:

determining a content element role for each extracted webpage content elements; and classifying each of the determined content element roles.

4. The method of claim 3, further comprising:

generating the at least one data point based on at least one classified content element role.

5. The method of claim 1, further comprising:

querying the at least one extracted data point to the at least one external data analysis system configured to provide the at least an additional layer of information related to the at least one queried extracted data point; and receiving the at least one enriched data point from the at least external one data analysis system in response to the query.

6. The method of claim 5, wherein querying the at least one extracted data point to the at least one external data analysis system further comprises:

communicating with the at least one external data analysis system through the at least one application programming interface (API) exposed by the at least one external data analysis system, wherein the communication with the at least one external data analysis system occurs in real-time as the bid request is received.

7. The method of claim 1, further comprising:

caching the at least one enriched data point.

8. The method of claim 7, wherein caching the at least one enriched data point further comprises:

caching the at least one enriched data point with a key, wherein the key is an in-cache data feature configured to provide for an in-cache location of data points associated with the key during a cache search.

9. The method of claim 7, further comprising:

checking that the cache memory includes the at least one enriched data point associated with the at least one extracted data point; and collecting, from the cache memory, the at least one enriched data point associated with the at least one extracted data point.

10. A non-transitory computer readable medium having stored thereon instructions for causing a processing circuitry to execute a process for enriching bid requests for real-time bidding on a digital advertisement placement, the process comprising:

processing a received bid request to extract at least one data point, wherein the bid request is received from a website requesting a placement of a digital advertisement, wherein extracting the at least one data point further comprises extracting webpage content elements included on a webpage specified in a uniform resource locator (URL) included in the received bid request;

determining that at least one enriched data point associated with the at least one extracted data point is missing from a cache memory, wherein the enriched data points include at least an additional layer of information on the at least one extracted data point;

causing generation, by at least one external data analysis system, of the at least one enriched data point based on the at least one extracted data point upon determining that at least one enriched data point associated with the at least one extracted data is missing from the cache memory, wherein the at least one external data analysis system exposes at least one application programming interface (API));

receiving, by the at least one external data analysis system, the at least one extracted data point that includes the webpage content elements;

associating the at least one enriched data point with the received bid request; and providing, via a real-time bidding system, the at least one enriched data point to a plurality of advertiser systems to allow a refined real-time bidding on the placement of the digital advertisement in a webpage of the website in response to a bid on the received bid request, wherein the real-time bidding system is configured to access the at least one enriched data point from the at least one external data analysis system via the API.

11. A system for enriching bid requests for real-time bidding on a digital advertisement placement, comprising:

a processing circuitry; and a memory, the memory containing instructions that, when executed by the processing circuitry, configure the system to:

process a received bid request to extract at least one data point, wherein the bid request is received from a website requesting a placement of a digital advertisement, wherein extracting the at least one data point further comprises extracting webpage content elements included on a webpage specified in a uniform resource locator (URL) included in the received bid request;

determine that at least one enriched data point associated with the at least one extracted data point is missing from a cache memory, wherein the enriched data points include at least an additional layer of information on the at least one extracted data point;

cause generation, by at least one external data analysis system, of the at least one enriched data point based on the at least one extracted data point upon determining that at least one enriched data point associated with the at least one extracted data is missing from the cache memory, wherein the at least one external data analysis system exposes at least one application programming interface (API);

receive, by the at least one external data analysis system, the at least one extracted data point that includes the webpage content elements;

associate the at least one enriched data point with the received bid request; and provide, via a real-time bidding system, the at least one enriched data point to a plurality of advertiser systems to allow a refined real-time bidding on the placement of the digital advertisement in a webpage of the website in response to a bid on the received bid request, wherein the real-time bidding system is configured to access the at least one enriched data point from the at least one external data analysis system via the API.

12. The system of claim 11, wherein the received bid request includes at least: an identifier, a uniform resource locator (URL) of a requested webpage, a request application identifier, a mobile application, a bundle identifier for a connected TV application, a user location data, a date, and a time.

13. The system of claim 11, wherein the system is further configured to:

determine a content element role for each extracted webpage content elements; and classify each of the determined content element roles.

14. The system of claim 13, wherein the system is further configured to:

generate the at least one data point based on the classified content element roles.

15. The system of claim 11, wherein the system is further configured to:

query the at least one extracted data point to the at least one external data analysis system configured to provide the at least an additional layer of information related to the at least one queried extracted data point; and receive the at least one enriched data point from the at least one external data analysis system in response to the query.

16. The system of claim 15, wherein the system is further configured to:

communicate with the at least one external data analysis system through the at least one application programming interface (API) exposed by the at least one external data analysis system, wherein the communication with the at least one external data analysis system occurs in real-time as the bid request is received.

17. The system of claim 11, wherein the system is further configured to:

cache the at least one enriched data point.

18. The system of claim 17, wherein the system is further configured to:

cache the at least one enriched data point with a key, wherein the key is an in-cache data feature configured to provide for an in-cache location of data points associated with the key during a cache search.

19. The system of claim 17, wherein the system is further configured to:

check that the cache memory includes the at least one enriched point associated with the at least one extracted data point; and collect, from the cache memory, the at least one enriched data point associated with the at least one extracted data point.

20. The method of claim 1, further comprising:

placing, via the real-time bidding system, the digital advertisement in the webpage of the website based on results of the refined real-time bidding, wherein placing the digital advertisement further comprises sending the digital advertisement to a web server for placement of the digital advertisement in the webpage.

21. The method of claim 1, wherein the bid request is a first bid request, wherein the refined real-time bidding is a first bidding, further comprising:

caching the generated at least one enriched data point in the cache memory; and retrieving, from the cache memory, the at least one enriched data point based on at least one data point extracted from a second bid request; and providing, via the real-time bidding system, the retrieved at least one enriched data point to the plurality of advertiser systems to allow a second real-time bidding.

22. The method of claim 21, wherein the extracted at least one data point is stored in the cache memory, further comprising:

refreshing the cache memory with respect to the extracted at least one data point according to a first cache refresh policy; and refreshing the cache memory with respect to the enriched at least one data point according to a second cache refresh policy, wherein the first cache refresh policy is different from the second cache refresh policy.

* * * * *